(12) United States Patent
Fahner et al.

(10) Patent No.: US 7,774,272 B2
(45) Date of Patent: *Aug. 10, 2010

(54) APPARATUS AND METHOD FOR SIMULATING AN ANALYTIC VALUE CHAIN

(75) Inventors: Gerald Fahner, Austin, TX (US); Joseph P. Milana, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/143,453

(22) Filed: Jun. 20, 2008

(65) Prior Publication Data

US 2008/0319897 A1 Dec. 25, 2008

Related U.S. Application Data

(62) Division of application No. 11/463,245, filed on Aug. 8, 2006.

(60) Provisional application No. 60/706,936, filed on Aug. 9, 2005.

(51) Int. Cl.
*G06Q 40/00* (2006.01)
(52) U.S. Cl. .......................................... 705/38; 705/39
(58) Field of Classification Search ....................... None
See application file for complete search history.

(56) References Cited

U.S. PATENT DOCUMENTS 6,308,162 B1 * 10/2001 Ouimet et al. ................. 705/7
2004/0111363 A1 * 6/2004 Trench et al. ................. 705/39

* cited by examiner

*Primary Examiner*—Jason M Borlinghaus
(74) *Attorney, Agent, or Firm*—Mintz, Levin, Cohn, Ferris, Glovsky and Popeo, P.C.

(57) ABSTRACT

A computer-implemented simulator models the entire analytic value chain so that data generation, model fitting and strategy optimization are an integral part of the simulation. Data collection efforts, data mining algorithms, predictive modeling technologies and strategy development methodologies define the analytic value chain of a business operation: data→models→strategies→profit. Inputs to the simulator include consumer data and potential actions to be taken regarding a consumer or account. The invention maps what is known about a consumer or an account and the potential actions that the business can take on that consumer or account to potential future financial performance. After iteratively performing simulations using varying inputs, modeling the effect of the innovation on a profit model, the simulator outputs a prediction of the commercial value of an analytic innovation.

17 Claims, 15 Drawing Sheets

| Characteristics | Their Weight Patterns | | |
|---|---|---|---|
| | Posited Scorecard R | Mildly irrational scorecard Q1 | Very irrational scorecard Q2 |
| CB score | / | / | /\ |
| Mts. since last TL opened | / | / | / |
| Avg. mts. on file | / | — | /\ |
| # Satisfactory ratings | / | — | — |
| Applicant age | — | / | /\/ |

Fig. 9

| Credit Card Portfolio | | | | | | | |
|---|---|---|---|---|---|---|---|
| Risk Score | Low | | Medium | | | High | |
| Revenue Score | | Low | Med | High | Low | Med | High |
| Credit Line Utilization | | | | Low / High | | | Low / High |
| Recommended Increase (82%) | 0 | 0 | ... | 2000 | ... | | 3000 |
| Test Level A1 (Random 3%) | 0 | 0 | | 0 | | | 1500 |
| Test Level A2 (Random 3%) | 0 | 0 | | 1000 | | | 2000 |
| Test Level A3 (Random 3%) | 0 | 500 | | 2500 | | | 2500 |
| Test Level A4 (Random 3%) | 0 | 1000 | | 3000 | | | 3500 |
| Test Level A5 (Random 3%) | 500 | 1500 | | 3500 | | | 4000 |
| Test Level A6 (Random 3%) | 1000 | 2000 | | 4000 | | | 5000 |
| | I | II | | III | | | IV |

APPARATUS AND METHOD FOR SIMULATING AN ANALYTIC VALUE CHAIN

CROSS REFERENCE TO RELATED APPLICATIONS

This application is a divisional of U.S. patent application Ser. No. 11/463,245, filed Aug. 8, 2006 which claims benefit of U.S. Provisional Patent Application Ser. No. 60/706,936, filed Aug. 9, 2005, both are incorporated herein by reference.

BACKGROUND OF THE INVENTION

1. Field of the Invention

Generally, the invention relates to automated decision-making and optimizing automated decision-making processes. More particularly, the invention relates to data processing systems and methods for simulating an analytic value chain.

2. Background Information

Businesses must make a multitude of decisions every day, both large and small. These decisions may involve determining what price to charge a particular customer, whether to grant a loan or an insurance policy, how to route air traffic or whether or not to issue a prescription to a particular patient. Particularly in financial services industries, entities have traditionally employed large numbers of low- and mid-level knowledge workers to make many of these decisions, a practice which often entailed high operation and opportunity costs to reach decisions. Additionally, traditional decision-making processes can be slow and cumbersome. For example, using traditional methods of mortgage underwriting, obtaining a loan approval often required several months. The human factor in decision-making can also result in imprecise, inconsistent decisions. Seeking to improve such factors in decision-making as cost, speed, consistency, precision and agility, businesses are turning more and more to automated decision-making technologies.

Using these technologies it becomes possible to build automated systems that sense data, apply codified knowledge or logic to the data, and make decisions with little or no human intervention. Additionally, the Internet has made automated decision-making more feasible. More and more individual financial data is obtainable over the Internet in real-time. For example, an individual's FICO (FAIR ISAAC CORPORATION, Minneapolis Minn.) score, which summarizes the consumer's credit relationships and payment history into one number, is available in a second or two. Consumers easily apply for loans online. Automated decision-making can help businesses generate decisions that are more consistent than those made by people and can help managers move quickly from insight to decision to action.

Since the early days of scoring and automated decision making, there has been a quest to improve data, models, and strategies, with the hope of improving decision yield, and thereby improving the profit picture and competitive capacity of a business operation. However, there are costs and risks associated with introducing changes such as analytic innovations to a current operation. Even limited field tests can be expensive to administer and businesses usually desire ROI (return on investment) estimates for proposed analytic innovations before proceeding to field testing.

SUMMARY OF THE INVENTION

A computer-implemented simulator models the entire analytic value chain so that data generation, model fitting and strategy optimization are an integral part of the simulation. Data collection efforts, data mining algorithms, predictive modeling technologies and strategy development methodologies define the analytic value chain of a business operation: data→models→strategies→profit, as described in commonly-assigned U.S. patent application Ser. No. 10/697,907, Method and apparatus for creating and evaluating strategies. Inputs to the simulator include consumer data and potential actions to be taken regarding a consumer or account. The invention maps what is known about a consumer or an account and the potential actions that the business can take on that consumer or account to potential future financial performance. After iteratively performing simulations using varying inputs, modeling the effect of the innovation on a profit model, the simulator outputs a prediction of the commercial value of an analytic innovation.

BRIEF DESCRIPTION OF THE DRAWINGS

FIG. 9 provides a chart comparing score weight patterns for a posited profit model, a mildly irrational, and a very irrational screen;

DETAILED DESCRIPTION

Figure 1:
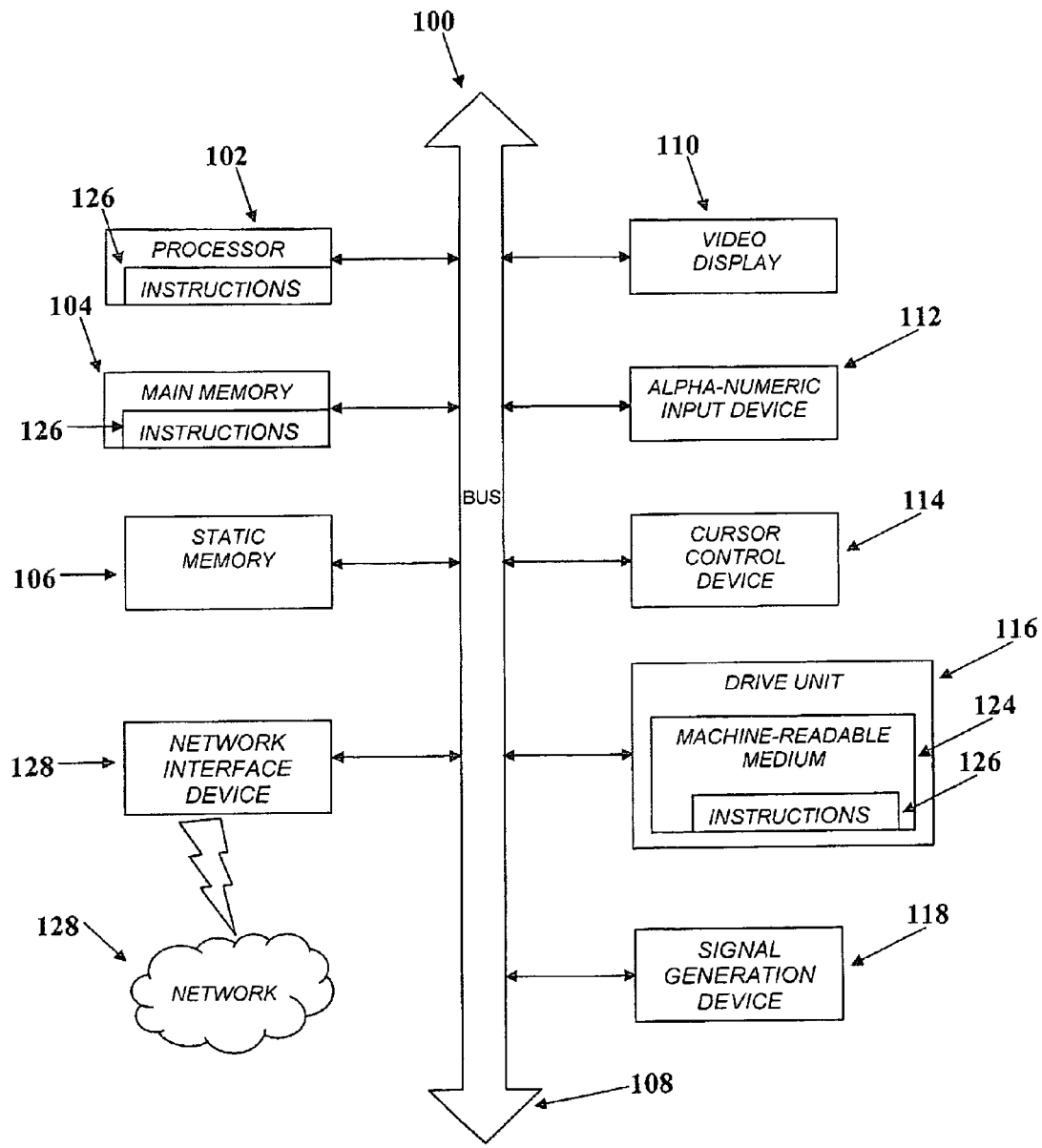
FIG. 1 provides a diagram of a machine in the exemplary form of a computer system within which a set of instructions, for causing the machine to perform any one of the methodologies discussed herein below, may be executed.

A computer-implemented simulator models the entire analytic value chain so that data generation, model fitting and strategy optimization are an integral part of the simulation. Data collection efforts, data mining algorithms, predictive modeling technologies and strategy development methodologies define the analytic value chain of a business operation: data→models→strategies→profit. Inputs to the simulator include consumer data and potential actions to be taken regarding a consumer or account. The invention maps what is known about a consumer or an account and the potential actions that the business can take on that consumer or account to potential future financial performance. After iteratively performing simulations using varying inputs, modeling the effect of the innovation on a profit model, the simulator outputs a prediction of the commercial value of an analytic innovation.

The notion of the analytic value chain captures the intuition that improved data sources allow for more powerful scoring models to be built. Better scores, whether they result from better data or from better model estimation strategies enable the development of improved decision strategies. Superior strategies lead to higher profit. Analytic innovations offer opportunities to strengthen the analytic value chain and to reap higher profit.

Analytic value chain simulation (AVACS) attempts to rationalize and quantify these intuitive ideas, using a decision-theoretic framework. What is the importance of this? There are costs and risks associated with implementing any changes to the current operation. Even limited field tests can be expensive to administer. Businesses desire ROI (return on investment) estimates for proposed analytic innovations, before eventually proceeding to field testing. AVACS generates estimates for the return.

Several embodiments of the invention are described herein. The several embodiments all share a common objective and overarching methodology: they are tools that enable the user to learn more about the relationship between observed consumer behavior and potential actions applied to the consumer on the one hand and future profit on the other. AVACS (analytic value chain simulation) posits a known formula to mimic the true relationship. It carefully distinguishes this "true" relationship from an "estimated" relationship. This framework allows investigation into how an analytic innovation may eventually lead to an improved approximation to the known true relationship, or conversely, how the absence of an analytic innovation may result in a loss of approximation quality. Unlike statistical measures of fit quality, AVACS goes a step further in that it evaluates the commercial value of an analytic innovation. It does this by linking improvements in the approximation quality to improvements in the decisions or actions, and, finally, to improvements in profit.

Herein below, the general principles and features of the invention are described. Afterward, several exemplary implementations of the invention are described:
- predicting the value of transaction data for credit line management;
- predicting the value of reject inference for account origination; and
- predicting the value of an experimental design for faster learning in closed-loop adaptive control.

FIG. 1 shows a diagrammatic representation of a machine in the exemplary form of a computer system 100 within which a set of instructions, for causing the machine to perform any one of the methodologies discussed herein below, may be executed. In alternative embodiments, the machine may comprise a network router, a network switch, a network bridge, personal digital assistant (PDA), a cellular telephone, a web appliance or any machine capable of executing a sequence of instructions that specify actions to be taken by that machine.

The computer system 100 includes a processor 102, a main memory 104 and a static memory 106, which communicate with each other via a bus 108. The computer system 100 may further include a display unit 110, for example, a liquid crystal display (LCD) or a cathode ray tube (CRT). The computer system 100 also includes an alphanumeric input device 112, for example, a keyboard; a cursor control device 114, for example, a mouse; a disk drive unit 116, a signal generation device 118, for example, a speaker, and a network interface device 120.

The disk drive unit 116 includes a machine-readable medium 124 on which is stored a set of executable instructions, i.e. software, 126 embodying any one, or all, of the methodologies described herein below. The software 126 is also shown to reside, completely or at least partially, within the main memory 104 and/or within the processor 102. The software 126 may further be transmitted or received over a network 128 by means of a network interface device 120.

In contrast to the system 100 discussed above, a different embodiment of the invention uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments of this invention may be used as or to support software programs executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media, flash memory devices; electrical, optical, acoustical or other form of propagated signals, for example, carrier waves, infrared signals, digital signals, etc.; or any other type of media suitable for storing or transmitting information.

Overview Description of AVACS

Posited Profit Model

The cornerstone of the simulation is to posit a model for expected profit. It maps what is known about a consumer or an account, and the potential actions that the business can take on that consumer or account, to potential future financial performance. While the description herein has been limited to a discussion of profit for the sake of simplicity, the description is intended only to be illustrative. In fact, businesses are almost always interested in multiple, competing performance objectives, such as profit, growth, and loss. The simulation tool presented herein may be generalized to multi-dimensional performance measures. A model for expected future profit from an account or consumer may have the form:

$$E\text{profit} = f(X, A; \beta) \tag{Eq. 1}$$

where:

X: Data available about the consumer at time of decision

A: Potential actions applicable to the consumer $\beta$: Model parameters.

The data X can include anything that provides insight into the consumer, including internal and external data sources:
- application and survey information;
- transaction patterns and scores; and
- actions that were previously applied to the consumer or account.

The potential actions A are members of a fixed set of actions pertaining to a particular decision area, for example:
- Accept/Reject for account origination; and/or
- discrete levels of Line Increase Amount for credit card line management. The potential actions are under the control of the decision maker.

The structural form of the profit function and the values of the model parameters are informed by data and domain knowledge. Preferably, the posited profit model reflects the best available knowledge about the dependency of profit on consumer or account information and actions. For example, if there is evidence that profit depends on a variable x, then such dependency should be reflected in the model. In one embodiment of the invention, it is assumed that this model represents the true relationship. In another embodiment, described herein below, this assumption is relaxed.

Approximation Quality and Profit

Figure 2:
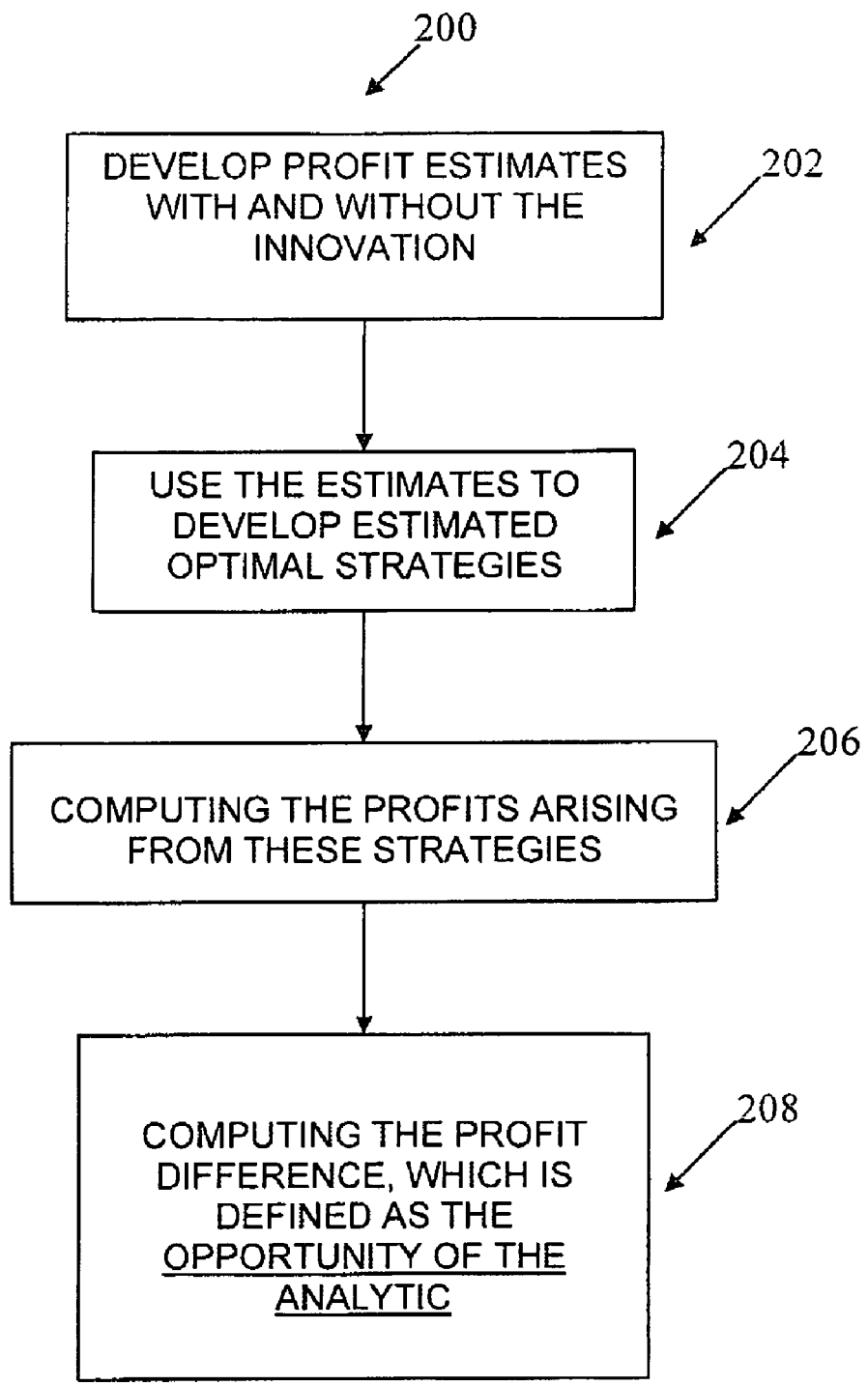
FIG. 2 is a block diagram of a method for quantifying a relationship between approximation quality and profit.

A great number of analytic innovations serve the pursuit of learning more about the true relationship f and to approximate it as closely as possible—among them transaction-based scores, reject inference techniques, and experimental design. The commercial value, or opportunity, of such an innovation can be linked to its success at improving the estimate of f, compared to the approximation quality without the innovation. As shown in FIG. 2, a method 200 for quantifying this relationship between approximation quality and profit involves at least the following steps:
- developing estimates with and without the innovation 202;
- a using the estimates to develop estimated optimal strategies 204,
- computing the profits arising from these strategies 206; and
- computing the profit difference, which is defined as the opportunity of the analytic innovation 208.

Strategy Optimization

Within the context of the invention, a decision strategy is a mapping from the consumer or account information to the space of actions. A decision strategy may encompass a set of rules or logic that a business operation uses to determine what action to take in a particular circumstance to achieve a desired result. For example, a collections strategy could include rules that indicate which delinquent customers to contact, when, how, by which agents and in which order, in order to maximize return. The business seeks to uncover the best strategy, given business objectives and constraints. The present description is limited to the problem of unconstrained profit maximization. However, the simulation framework described here generalizes to optimization problems with multiple objectives and constraints. The optimal strategy is given by:

$$A^*(X) = \text{argmax}_{\{A \in ActionSet\}} f(X, A; \beta) \quad \text{(Eq. 2).}$$

In the real world, f is not known perfectly well, so the optimal strategy is also not perfectly well known. But we do have estimates for it, so we can determine estimated optimal strategies. Let $f^+(X,A;\beta^+)$ and $f^-(X,A;\beta^-)$ denote our estimates for f with and without the innovation, respectively. The estimated functions can differ in their data sources, their structure, and their parameter values. How we arrive at these estimates is application specific and will be discussed below in the sections devoted to the various implementations. The estimated optimal strategies with and without the innovation are, respectively:

$$A^+(X) = \text{argmax}_{A \in ActionSet} f^+(X,A;\beta^+) \quad \text{(Eq. 3).}$$

$$A^-(X) = \text{argmax}_{A \in ActionSet} f^-(X,A;\beta^-) \quad \text{(Eq. 4).}$$

Note that because $f^+ \neq f^-$, it may happen that $A^+ \neq A^-$.

Expected Profit and Opportunity

By virtue of the posited relationship, we calculate expected profit from the two strategies:

$$E\text{profit}^+(X) = f(X, A^+; \beta) \quad \text{(Eq. 5)}$$

$$E\text{profit}^-(X) = f(X, A^-; \beta) \quad \text{(Eq. 6).}$$

If $A^+ \neq A^-$, this tends to lead to profit differences. The expected total and mean portfolio profit for a portfolio of size N of individuals or accounts with characteristics $X_i$; $i=1, \ldots, N$ is:

$$E\text{profit}^+_{total} = \sum_{i=1}^{N} E\text{profit}^+(X_i) \quad \text{(Eq. 6)}$$

$$E\text{profit}^+_{mean} = \frac{1}{N} E\text{profit}^+_{total}.$$

(Analogous for $E\text{profit}^-$). The total and mean innovation opportunity is:

$$\text{Oppt}_{total} = E\text{profit}_{total}^+ - E\text{profit}_{total}^- \quad \text{(Eq. 7)}$$

$$\text{Oppt}_{mean} = E\text{profit}_{mean}^+ - E\text{profit}_{mean}^-$$

Uncertainty and Robustness

The assumption that the posited relationship f is true is strong. This can be relaxed, by allowing f to vary over an uncertain range. Variations can be introduced manually, for example by stress-testing specific parameters or functional relationships in f; or automatically, for example, by Monte-Carlo sampling of functions $f_k$; $k=1, \ldots, K$, where K is the number of Monte-Carlo draws. For this purpose, we set $f_k = f(X,A;\beta_k)$, where the $\beta_k$ are random realizations of model parameters, which are drawn from a distribution located around the most likely values $\beta$. So the functions $f_k$ are located around the most likely function, f. Expected profit becomes a random variable. The random profits with and without the innovation, for the k'th Monte-Carlo draw, are:

$$E\text{profit}_k^+(X) = f(X, A^+; \beta_k) \quad \text{(Eq. 8)}$$

$$E\text{profit}_k^-(X) = f(X, A^-; \beta_k) \quad \text{(Eq. 9).}$$

The associated random totals and means are:

$$E\text{profit}^+_{k,total} = \sum_{i=1}^{N} E\text{profit}_k^+(X_i) \quad \text{(Eq. 10)}$$

$$E\text{profit}^+_{k,mean} = \frac{1}{N} E\text{profit}^+_{k,total}$$

(Analogous for $E\text{profit}^-$). The random innovation opportunities are:

$$\text{Oppt}_{k,total} = E\text{profit}_{k,total}^+ - E\text{profit}_{k,total}^-$$

$$\text{Oppt}_{k,mean} = E\text{profit}_{k,mean}^+ - E\text{profit}_{k,mean}^- \quad \text{(Eq. 11)}$$

Uncertain distributions for random profits and random opportunities can be plotted and standard deviations and confidence intervals can be derived. If the opportunity distribution is positive, then the value of the innovation is robust under uncertainty about the true relationship.

Sources of Approximation Error

Approximation error arises from two sources: bias, and variance. An estimated model is biased if the model form is incorrectly specified, for example, if the model misses important variables. This is the case in the first implementation, where the true model depends on the transaction score while the estimated model $f^-$ does not.

The variance of an estimate or a prediction depends on: properties of the development sample used to fit the model; where the predictions are made; and details of the inference technique. In the second implementation below, a novel reject inference technique improves on the extrapolation into the rejected population. In the third implementation, experimental design enriches the development sample by collecting rich information about the true relationship.

AVACS is at the core of each of these implementations. There are, however, differences in the process of arriving at the estimates $f^+$, $f^-$. Specifics are presented in the sections below devoted to each implementation.

Figure 3:
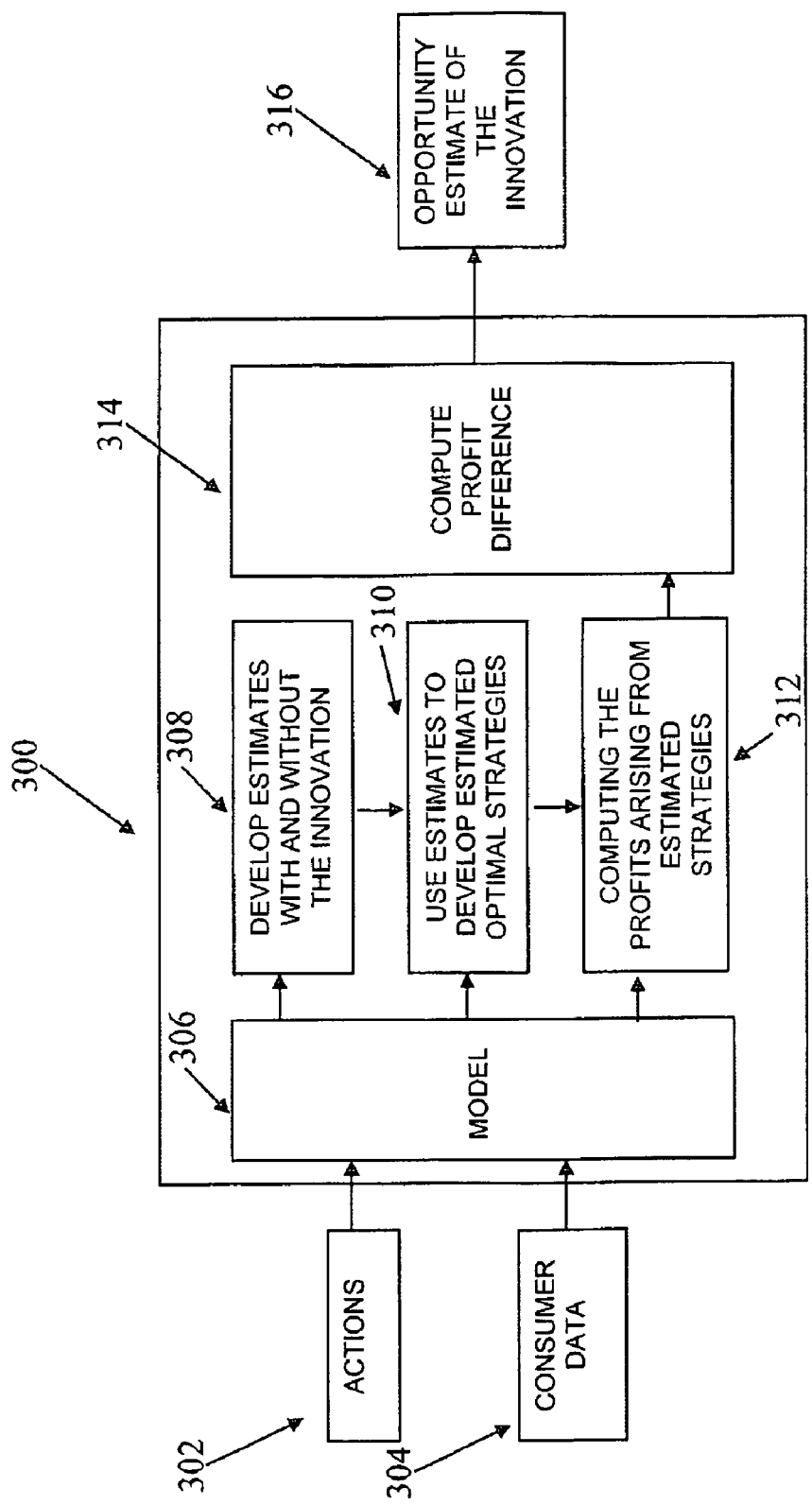
FIG. 3 provides a block diagram of a software implemented engine for simulating an analytic value chain.

As described above, the methodologies comprising the invention are implemented by means of executable code running on a computing device that includes at least a processing core, storage means, input/output devices and means for communicatively coupling all elements of the computer, such as a data bus. Therefore, in one embodiment, the invention is a software simulation engine made up of one or more units of executable code, which, when executed, perform the various steps involved in the methods herein described and outputting an estimate of the value, or opportunity of an analytic innovation. FIG. 3 is a block diagram of a software simulation engine 300. As above, the simulation engine 300 includes one or more functional units. In one embodiment of the invention, each functional unit may constitute a discrete program, program unit or software object. In another embodiment, the simulation engine 300 may be a single computer program that performs substantially all of the functions depicted in FIG. 3. As described above, the simulation engine 300, accepts as input (1) data concerning consumer behavior 304, and/or (2) actions to be taken in regard to the consumer based on the data 302. The data is input to a model 306 as previously described. The engine 300 further includes:

a component 308 for developing estimates of profit with and without the analytic innovation;

a component 310 for using estimates to develop estimated optimal strategies 210;

a component 312 for computing the profits arising from the estimated strategies; and a component 314 for computing the profit difference. The engine outputs an opportunity estimate 316 of the innovation.

It will be appreciated that the foregoing embodiment of the simulation engine 300 is general in nature. Other embodiments of the simulation engine may contain fewer of the components shown in FIG. 3, or different components than shown in FIG. 3. For example, the invention encompasses a variety of methodologies as described below. Various embodiments of the simulation engine include components for performing any and/or all of the described methodologies. An embodiment of the simulation engine is preferably coded using vector programming techniques in order to make optimally efficient use of memory and other computing resources.

Figure 4:
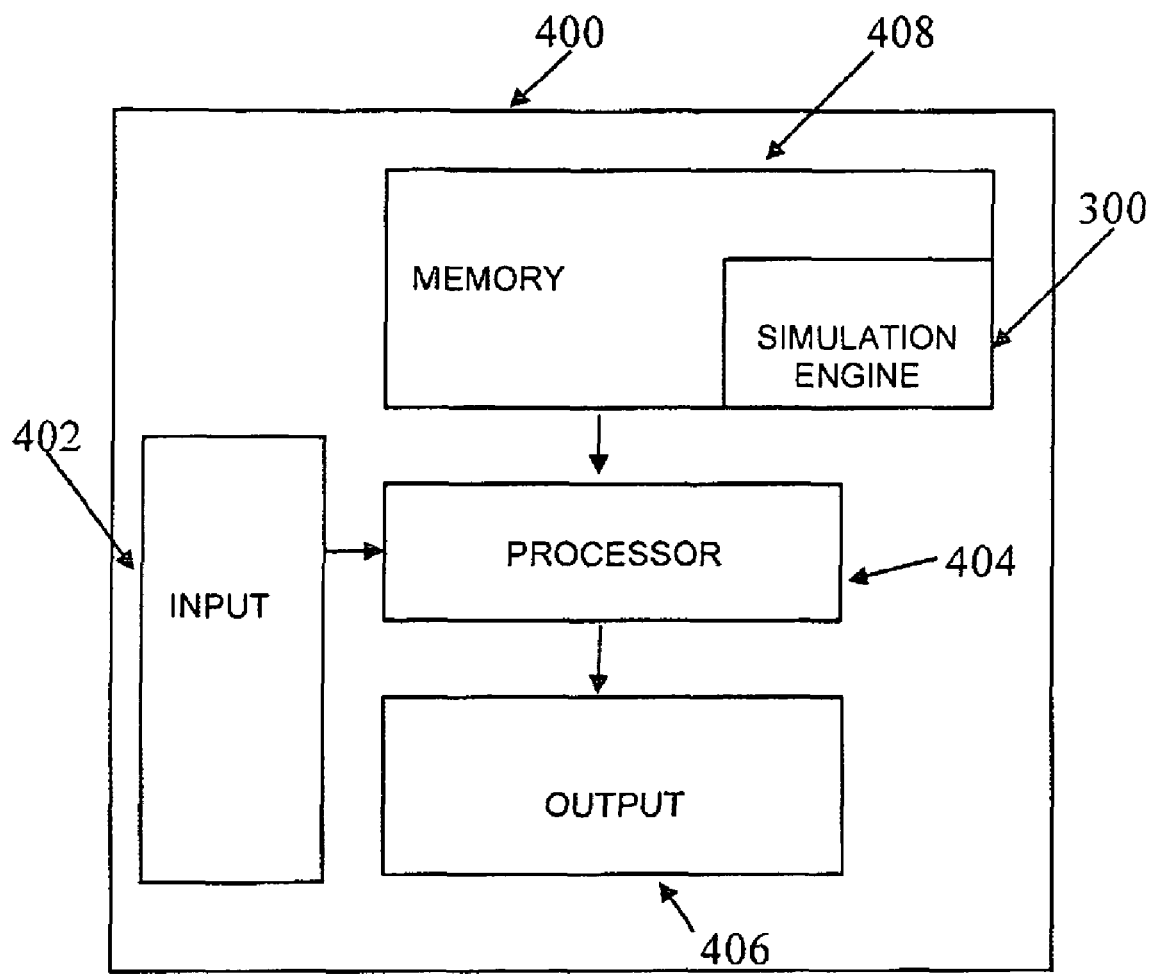
FIG. 4 provides a schematic diagram of an apparatus for simulating an analytic value chain.

As shown in FIG. 4, a further embodiment of the invention is an apparatus 400 for simulating an analytic value chain. The apparatus includes a simulation engine 300 as previously described. The drawing shows the engine 300 as residing in the memory 408 of the apparatus 400. Additionally, the engine may reside at least partially in the processor 404 and/or a mass storage device (116, FIG. 1) such as, for example, a hard disk drive. Typically, the engine 300, configured to perform one or more methodologies for simulating an analytic value chain to yield an estimate of the opportunity provided by an analytic innovation, instructs the processor to perform operations as shown in FIGS. 5-15. Additionally, the simulation engine instructs the processor to accept inputs as described herein from one or more input devices 402, such as, for example, a keyboard, a key pad, a mouse, or a data feed delivered to a data port through a wired or wireless connection. The operations of FIGS. 5-15 having been performed on the input, the simulation engine 300 instructs the processor 404 to calculate an estimate of the opportunity provided by analytic information and output the estimate via an output device 406, such as a display, a printer, or a data port configured to transmit said estimate via a wired or wireless connection.

Value of Transaction Risk Score for Credit Card Line Management

Motivation

A transaction-based risk score can be thought of as a regression function that models default probability as a function of transaction time series features and other features indicative of risk. Standard measures of score power such as area under a ROC (receiver operating characteristic) curve, KS (Kolmogorov-Smirnov test), and Divergence provide strong evidence that credit card transaction data contain significant information about the risk of an account or a consumer that cannot be explained by credit bureau risk scores and behavior scores alone. Research performed by the Applicant has shown, for example, that a transaction risk score can identify 5% more delinquent accounts at a typical authorization cutoff, compared to a behavior score.

Simulation Setup

Figure 5:
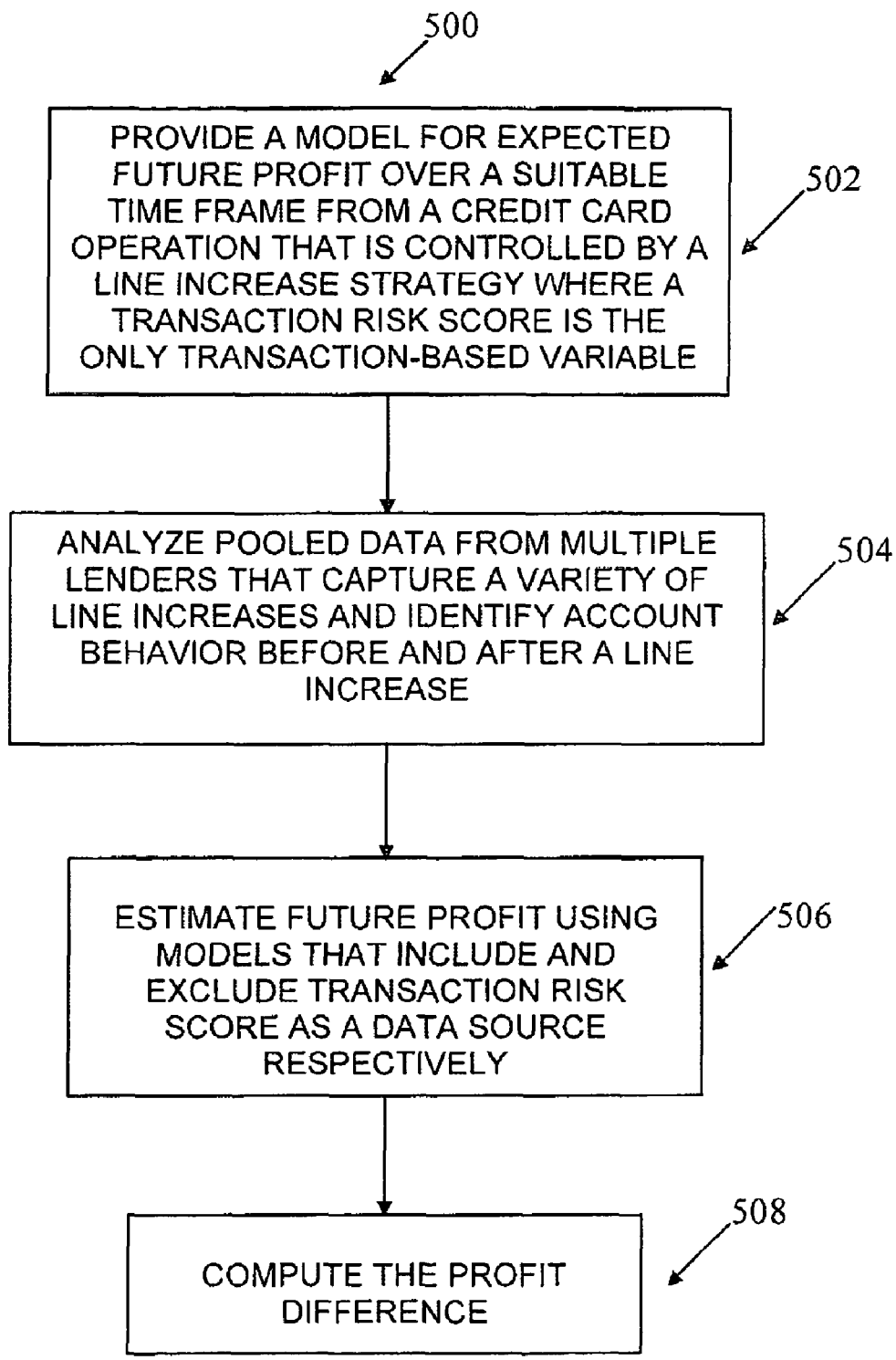
FIG. 5 is a block diagram of a method for estimating value of a transaction risk score for credit card line management.

FIG. 5 shows a block diagram of a method 500 for estimating value of a transaction risk score for credit card line management.

We posit a model of the form:

$$E\text{profit}=f(X,CLI;\beta)$$

for expected future profit over some suitable time frame from a credit card operation that is controlled by a line increase strategy 502. Here, X includes a transaction risk score as the only transaction-based variable in the model, and other key variables that measure account behavior (such as behavior risk score, revolving balance, utilization, etc.). CLI represents potential credit line increase amounts, ranging from $0 to $3 k, in steps of $500. The expected profit model is a composite made up from various nonlinear regression functions and equations for profit drivers, such as default probability, expected loss, expected balance, expected revenue and attrition probability. The model is informed by analyzing pooled data from multiple lenders that capture a variety of line increases and identify account behavior before and after a line increase 504.

Next, future profit is estimated using models that include and exclude transaction risk score as a data source, respectively 506. In this implementation, we focus on the loss of accuracy of the estimation if the transaction risk score is excluded as a data source. We set $f^+(X,CLI,\beta^+)=f(X,CLI,\beta)$, which is our best approximation. We determine $f^-(X,CLI,\beta^-)$ as our best constrained approximation that does not include the transaction risk score or any other transaction variables. The set of model parameters $\beta^-$ is constrained such that the transaction score doesn't contribute to the profit estimate. The estimated optimal strategy for $f^+$ depends on the transaction score but not on the behavior score. The estimated optimal strategy for $f^-$ depends on the behavior score but not on the transaction score.

Simulation Results

The differences in the strategies lead to differences in expected profit 508. The results indicate a significant opportunity of using transaction scores for credit line management:

TABLE 1

| $Eprofit_{mean}^-$ | $Eprofit_{mean}^+$ | $Oppt_{mean}$ |
|---|---|---|
| $44.20 | $50.22 | $6.02 |

Figure 6:
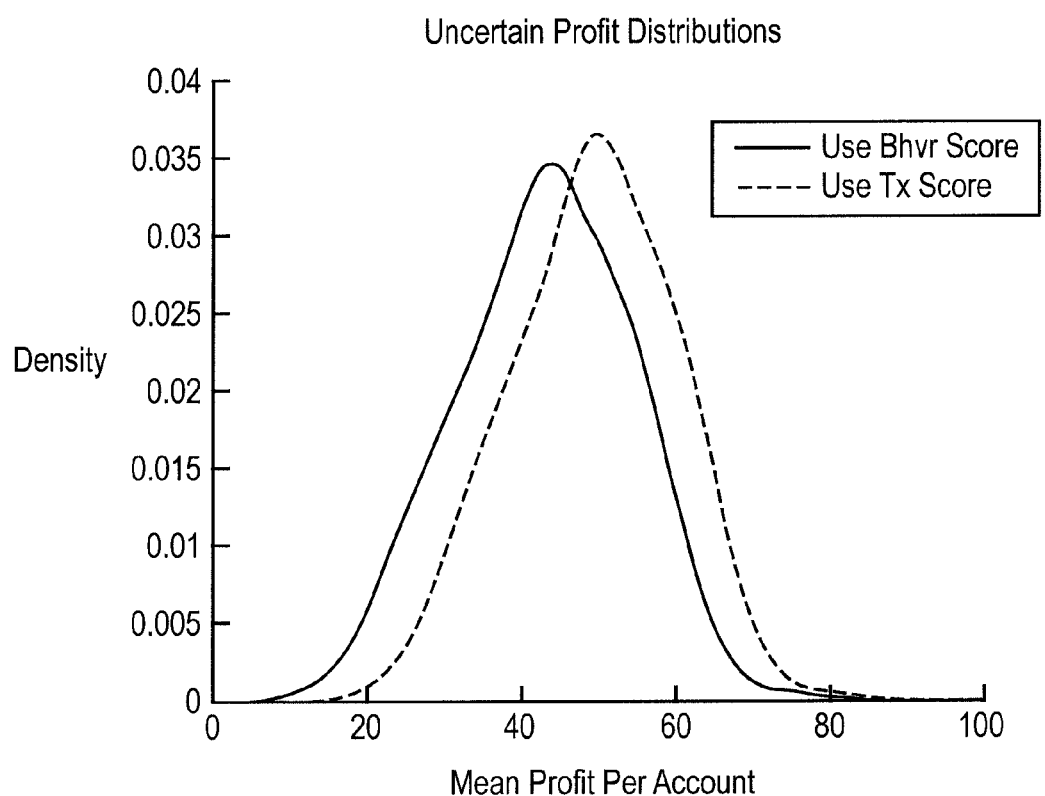
FIG. 6 shows a graph of uncertain profit distributions resulting from two different approaches to determining credit risk.
Figure 7:
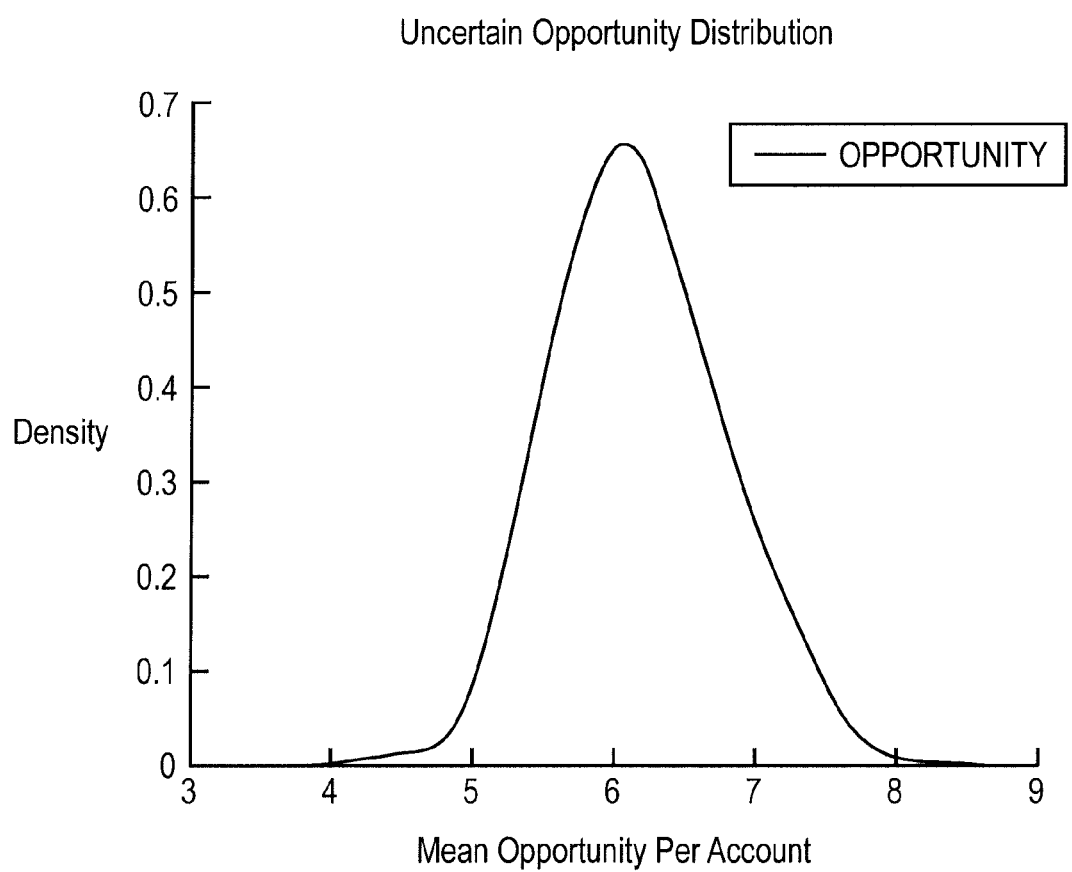
FIG. 7 shows a distribution of opportunity from an approach to determining credit risk that includes a transaction score.

FIG. 6 shows the distributions of uncertain expected profit for the two strategies. The expected profit in the strategy that omitted The uncertain future population default rate was the main driver of uncertainty in this simulation. Strategic use of the transaction score shifts the distribution of expected profit to larger values. But the graph of FIG. 1 does not tell how reliable the opportunity is in the presence of uncertainty. The graph of FIG. 7 provides the answer by plotting the corresponding distribution of opportunity from the transaction.

Monte-Carlo simulation results indicate that the transaction score constitutes a valuable and robust source of information for designing credit line increase strategies.

It should be appreciated that this simulation applies to any data source or data variable that serves to improve the approximation $f^+$.

(a) Value of a Novel Reject Inference Technology

Motivation

The problem of loan origination, stated in its simplest form, is to decide whether to accept or to reject an applicant based on some characteristics X. The standard solution is to develop a score S(X) that rank-orders by default risk and to accept only those applicants who pass a certain cutoff. As part of score development, there arises the problem of inferring the default probabilities of the rejected population from a truncated sample of accepts for whom we know performance. The simplest technique, which serves as a natural benchmark, is straightforward extrapolation from a regression model that is fit on the accept population, also called a Known Good/Bad model.

A problem with this approach arises if there are lurking variables that were used by the historic screen, but are not included in X. This situation is sometimes called "cherry picking." For example, a branch manager may have used his personal impression of an applicant to override a scoring system. If this is the case, domain expertise can often add value to a reject inference. For the purpose of the invention, however, it is assumed that X includes all the variables used by the historic screen, which is a reasonable assumption for many modern scoring operations.

Figure 8:
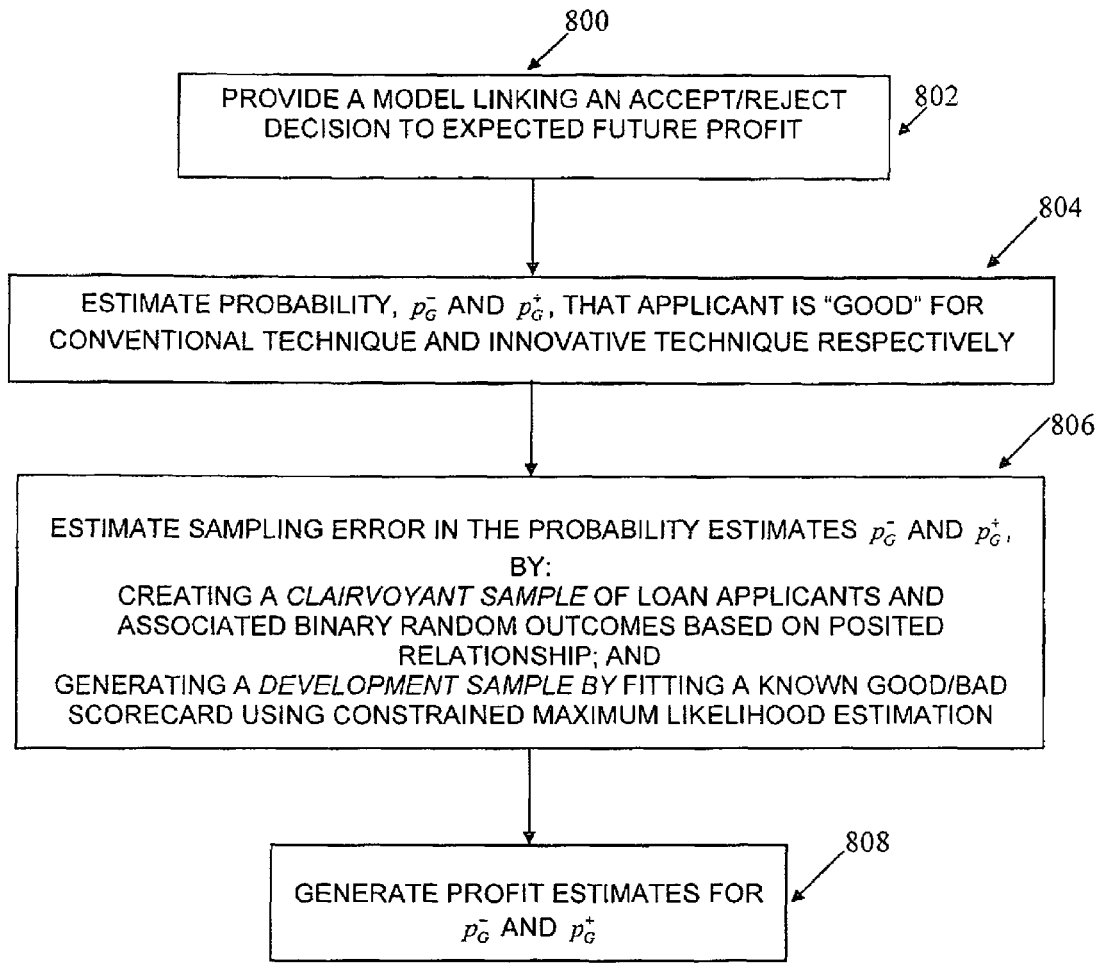
FIG. 8 provides a block diagram of a method for improving accuracy of a screen for predicting good/bad status of loan applicants based on reject inference.

Another problem for straightforward extrapolation arises if the extent of truncation is large. There is then very limited information on which to base a regression model for the entire population. The further it is desired to extrapolate into the rejects, the less accurate the predictions tend to be. Our innovation focuses on improving the accuracy of the extrapolation. It does this by utilizing information about the historic screen in the inference process. FIG. 8 provides a block diagram of a method for improving accuracy of a screen for predicting good/bad status of loan applicants based on reject inference.

Simulation Setup

To link the Accept/Reject decision to expected profit, we posit the following relationship 802:

$$Eprofit = f(X, A; \beta, g, l) = \begin{cases} p_G(X)g - (1 - p_G(X))l & \text{if } A = \text{``Accept''} \\ 0 & \text{if } A = \text{``Reject''} \end{cases} \quad \text{(Eq. 12)}$$

where:
X: Data available about the loan applicant
A: "Accept"/"Reject"
$p_G$: Posited probability of applicant being good
g: Constant gain associated with good loan
l: Constant loss associated with bad loan This formula is illustrative only. More complex profit formulas are conceivable, for example, by allowing for gain and loss to depend on X. Whatever the form of the profit function, the principal AVACS approach remains unaltered.

$p_G$ represents a score on a probability scale, which is represented by a Generalized Additive Model (GAM) of the form:

$$p_G(X;\beta) = \frac{1}{1 + \exp(-\beta_0 - \beta_1 R(X; \beta_2, \ldots, \beta_k))} \quad \text{(Eq. 13)}$$

where:
R: Score from a posited scorecard
$\beta_0, \beta_1$: Parameters for linear log (Odds) to score transformation
$\beta_2, \ldots, \beta_k$: Score weights In this application we focus on the sampling error in the probability estimates $p_G^-$ and $p_G^+$; 804 obtained by the straightforward extrapolation method and by our novel reject inference technique, respectively. The corresponding profit estimates, $Eprofit^-$ and $Eprofit^+$, are obtained by plugging the probability estimates into equation 12 (808). A GAM (generalized additive model) is of a class that captures nonlinear relationships between predictive variables and the score.

To generate these estimates, we start by creating a clairvoyant sample of loan applicants and associated binary random outcomes $(X, Y \in \{0,1\})$ 806. The applicant characteristics are taken from an empirical sample of loan applicants. The random outcomes are obtained by sampling from a Bernoulli distribution with parameter $p_G$:

$$Y = \text{Bernoulli}(p_G(X)) \quad \text{(Eq. 14)}$$

The clairvoyant sample thus arises from the posited relationship, by design.

Next, we generate a development sample 806. For this, we truncate the Y by means of a simulated historic selection process. We model this selection process by positing a historic application scorecard Q(X) and a cutoff:

$$Y_{known} = \begin{cases} Y & \text{if } Q \geq \text{historic cutoff} \\ \text{Missing} & \text{otherwise} \end{cases} \quad \text{(Eq. 15)}$$

Based on the development sample, we fit a Known Good/Bad scorecard using constrained maximum likelihood estimation. Scorecards approximate log (Odds) as a sum of characteristic scores, where the characteristic scores are stair functions in the variables X. The height of the stairs is given by the score weights for the levels of X. In our Known Good/Bad scorecard, we actually constrain the stair functions to typically monotone or unimodal shapes, which helps to stabilize the extrapolation into the truncated region. The restrictions are based on experience and theoretical considerations. Similar to bin smoothing, applying shape restrictions is a subjective act of model specification. This technique, as described in Introduction to Model Builder Scorecard, Fair Isaac White Paper, (2005) results in probability estimates PG and associated profit estimates Eprofit⁻. Our proprietary innovation results in probability estimates $p_G^+$ and associated profit estimates Eprofit⁺.

The estimated optimal origination strategies are:

$$A^- = \begin{cases} \text{"Accept"} & \text{if } Eprofit^- > 0 \\ \text{"Reject"} & \text{otherwise} \end{cases} \quad \text{Eq. 16}$$

$$A^+ = \begin{cases} \text{"Accept"} & \text{if } Eprofit^+ > 0 \\ \text{"Reject"} & \text{otherwise} \end{cases}$$

Since the $p_G^+$ differ from the $p_G^-$, differences in the strategies arise.

It should be appreciated that this simulation applies not only to our proprietary innovation but to any reject inference innovation that improves the estimates $p_G^+$.

To define a theoretical benchmark for comparison purposes, the optimal origination strategy is:

$$A^* = \begin{cases} \text{"Accept"} & \text{if } Eprofit > 0 \\ \text{"Reject"} & \text{otherwise} \end{cases} \quad \text{(Eq. 17)}$$

Associated with the optimal strategy is a Hypothetical Optimal Profit, which is attainable if the posited relationship is perfectly well known to the decision maker.

Simulation Results

We were interested under which operating conditions the novel reject inference technique would result in an opportunity. The principal parameters for our investigation were the extent of extrapolation (governed by the historic cutoff in relation to the estimated breakeven odds), and the degree of rationality of the historic screen (governed by the differences between the historic application score Q and the posited score R). The choice of these parameters generated a number of relevant scenarios: (i) mildly irrational historic screen with portfolio expansion, (ii) mildly irrational historic screen with portfolio contraction, and (iii) very irrational historic screen. Since sampling variation could lead to a "winner" by chance, we generated many clairvoyant- and development samples from the Bernoulli process, for each scenario. For each sample, we performed the inferences, estimated the optimal origination strategies, and calculated the expected profits from these strategies, thus generating sampling distributions of expected profits.

For scenarios (i) and (ii), above we generated the application scorecard Q1 as a slight modification of the posited scorecard R. This and a more irrational screen are schematically illustrated in FIG. 9. FIG. 9 shows Score weight patterns for the posited profit model, mildly irrational, and very irrational screen.

For example, the variable CB score does mildly and monotonically affect R, but has more influence in Q1. For scenario (iii), we assumed a more irrational screen Q2, by altering larger parts of the relationship.

Figure 10:
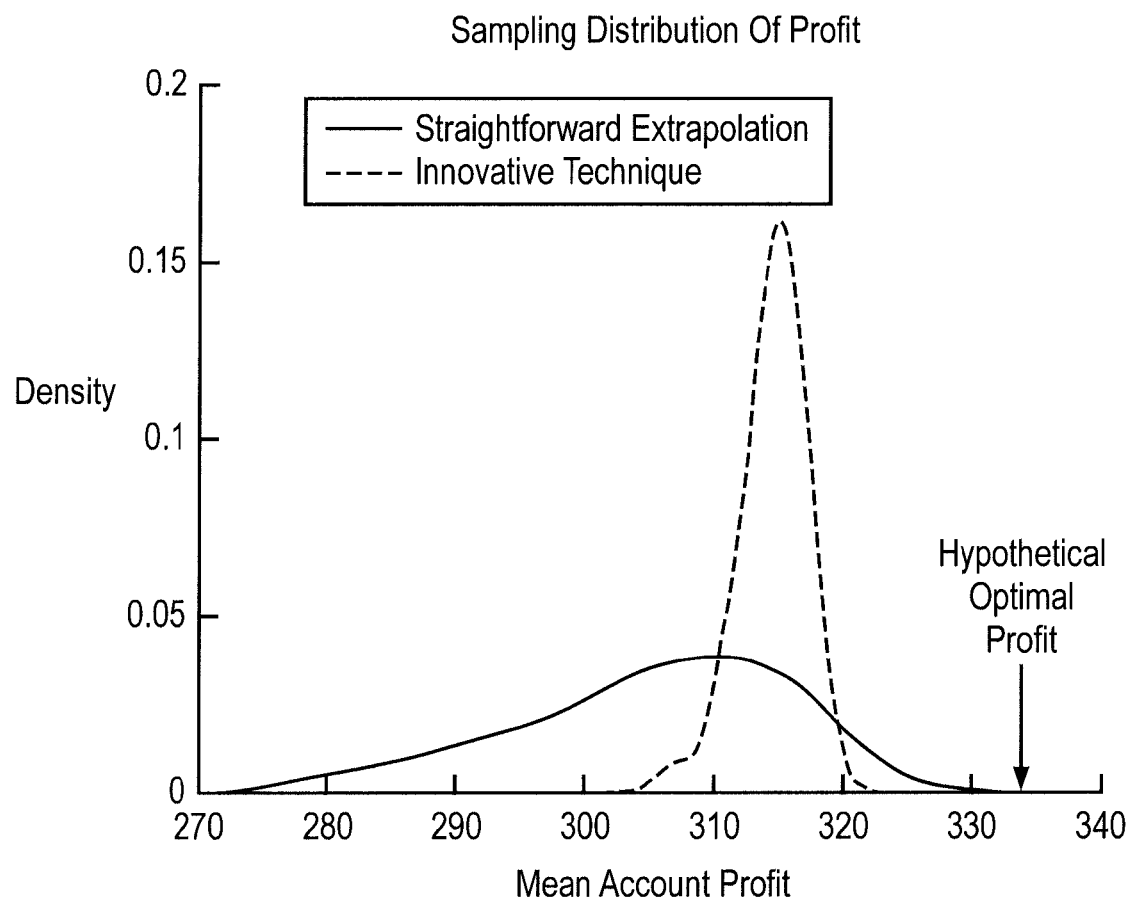
FIG. 10 shows a chart providing smoothed histogram of mean account profit for a first scenario.

The graph in FIG. 10, smoothed histograms of mean account profit for scenario (i), shows the sampling distributions of mean account profit for scenario (i), where the historic acceptance rate was 46% and the estimated optimal acceptance rate was 50%.

The profit distribution for the innovation is shifted towards higher values and exhibits lesser variance, as compared to the straightforward extrapolation method. Hypothetical Optimal Profit is shown as a benchmark.

Although neither of the two inference techniques were capable of achieving the Hypothetical Optimal Profit benchmark, this was largely because of sampling error. The number of known Goods in the development sample far outnumbered the known Bads (700 to 800), so that the limited number of Bads drives the sampling variation in this scenario.

For scenario (ii): portfolio contraction, and scenario (iii): very irrational historic screen, the novel technique performed comparable to straightforward extrapolation.

We conclude that the new technique appears to be beneficial under at least the following conditions:
- The variables used in the historic screen are known and used in score development; and
- The historic screen was developed in a somewhat rational way; and/or
- Portfolio expansion is envisioned.

The benefits over and above the straightforward extrapolation method arise from the feature of the new technique of reducing variance of the extrapolation into the rejects. The benefits gracefully degrade to zero if either the historic screen is very irrational, or portfolio contraction is envisioned.

Use of Experimental Design for Learning Strategies in a Changing Environment

Motivation

Learning and adaptation of decision strategies over time as economic conditions, competitors, portfolio composition, and consumer behavior change is crucial for the success of a business operation. In this context, it is useful to think about the analytic value chain as a feedback loop, shown below, where data, models, and strategies are constantly evolving with the goal of increasing profit or maintaining it at a high level.

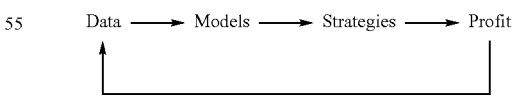

Champion/Challenger testing is a testing process that compares the effectiveness of an existing strategy—the champion strategy—with that of an alternative strategy—the challenger strategy in order to identify the more successful strategy. Adaptive control with champion/challenger testing is an important embodiment of such a feedback system, where the champion strategy is in place, and challenger strategies are contrived to compete against the champion. Accounts are randomly assigned to champion and challengers, so that the strategies compete on a level playing field. Profit, or any other measure of decision yield, is measured over some time period, and the strategy producing the best business result becomes the new champion for the next round of testing.

Figures 11, 12:
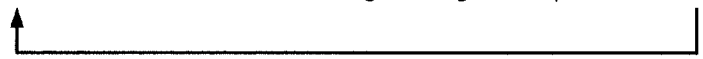
FIG. 11 provides a diagram of a stochastic learning strategy.
FIG. 12 is a diagram showing a behavioral result from following a posited learning strategy.

The tools of profit modeling and strategy optimization offer a different learning paradigm. Profit is estimated as a function of the data and the actions, and the profit-maximizing actions determine the new strategy. This, however, begs the question of how testing can improve profit estimates, and ultimately, profit. Within the context of the invention, we coined the expression "Learning Strategy," which is used to denote a stochastic strategy, as shown in FIG. 11, which emits experimental actions according to some experimental design.

Simulation Setup

Figure 13:
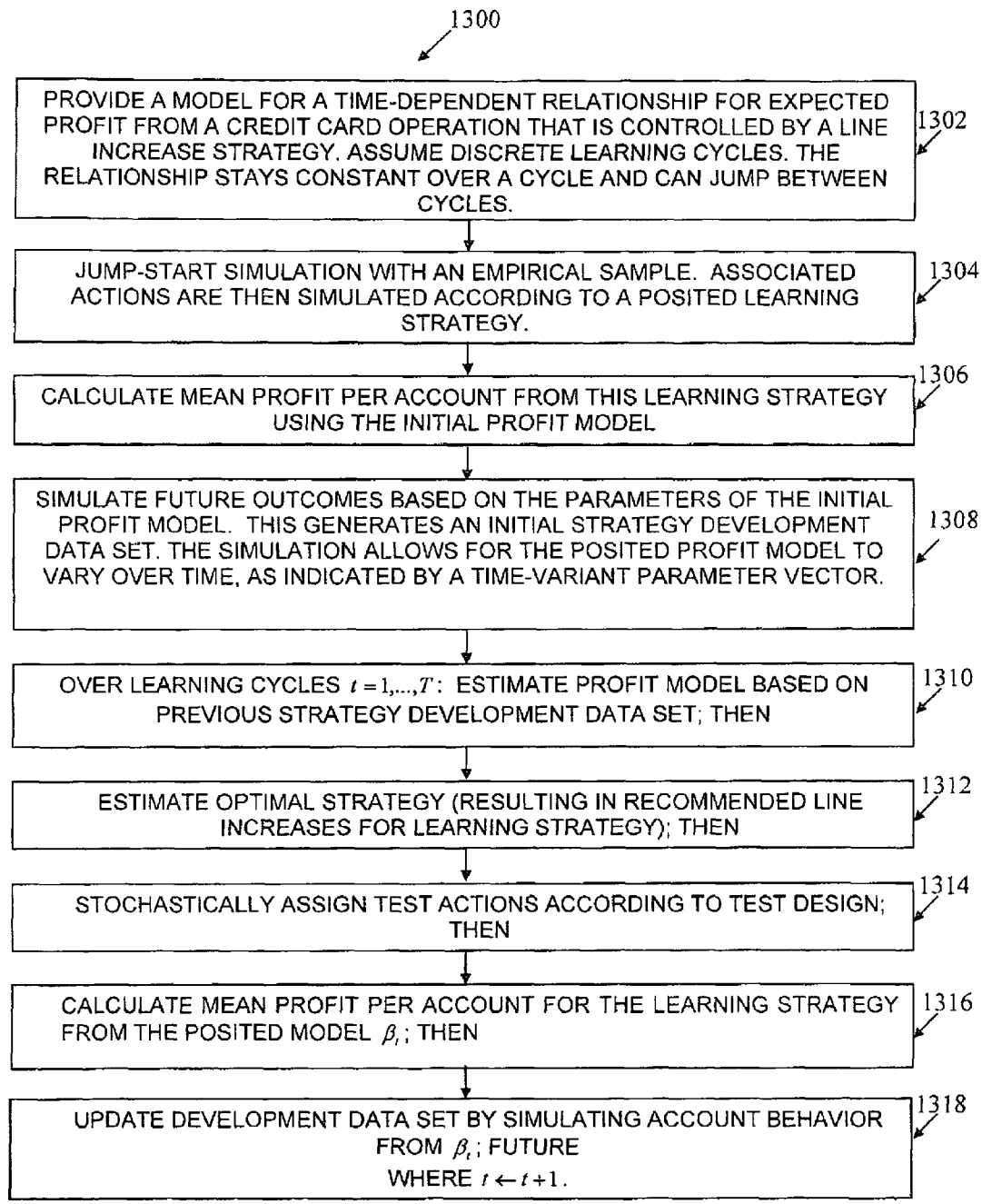
FIG. 13 provides a block diagram of a method for simulating future outcomes of a credit line increase strategy.

FIG. 13 shows a block diagram of a method for simulating future outcomes of a credit line increase strategy.

We posit a time-dependent relationship 1302 of the form:

$$E\text{profit} = f(X, CLI; \beta) \tag{Eq. 18}$$

for expected profit from a credit card operation that is controlled by a line increase strategy. We assume discrete learning cycles. The relationship stays constant over a cycle and can jump between cycles. We focus on the sampling error in the profit estimates and how this affects profit 10.

The simulation is iterative. It is jump-started with an empirical sample X. 1304 Associated actions CLI are then simulated according to a posited learning strategy, such as in FIG. 12, showing a simple example of learning strategy.

Leaves of a decision tree define segments I-IV, which are associated with recommended line increases and test designs for alternative increase levels. For an account falling into a segment, a random line increase is assigned to one of the amounts specified for this segment, according to a multinomial distribution. Preferably, the tests cover safe and potentially profitable ranges and are typically located around the recommended amount.

Mean profit per account from this learning strategy is then calculated 1306, using the initial profit model, which is parameterized by $\beta_0$. Next, we simulate future outcomes 1308, also based on the parameters $\beta_0$. Certain parameters for error distributions are required for this simulation, which are also posited. This generates our initial strategy development data set. The simulation allows for the posited profit model to vary over time, as indicated by a time-variant parameter vector $\beta_1$. Over learning cycles $t = 1, \ldots, T$:

- Estimate profit model based on previous strategy development data set 1310;
- Estimate optimal strategy (resulting in recommended line increases for learning strategy) 1312;
- Stochastically assign test actions according to test design 1314;
- Calculate mean profit per account for the learning strategy from posited model $\beta_1$ 1316; and
- Update development data set by simulating future account behavior from A 1318;
- where $t \leftarrow t+1$.

It is to be appreciated that this simulation applies to any experimental design that serves to improve the estimation of a profit model from data collected during the previous learning cycle.

Simulation Results

We simulated the dynamic evolution of data, models, strategies and profit over 20 learning cycles. Estimation of the profit model was completely automated. Thus, apart from specifying the initial model structure and constraints, no analyst intervention took place. The initial strategy at time $t=0$ was chosen to be very simple and sub-optimal, by assigning CI=$1000 to every account, independent of X. This resulted in an initial mean profit of approximately $50. Various simplifications were made to reduce the complexity of this simulation. Accordingly, the quoted profit figures are only of exemplary nature.

We perform the dynamic simulation for two learning strategies that differ in their aggressiveness of testing. The conservative learning strategy tests in a very narrow range around the recommended increase, and the probabilities that tests are taken are small, resulting in a small number of tests overall. The aggressive learning strategy performs more aggressive testing, both in terms of test ranges and test frequencies, resulting in a larger number of tests overall. We chose the posited profit model to remain constant over several learning cycles. At $t=T0$, we change the posited model, and leave it constant thereafter:

$$\beta_0 = \beta_1 = \ldots = \beta_9 \neq \beta_{10} = \ldots = \beta_{20}. \tag{Eq. 19}$$

Figure 15:
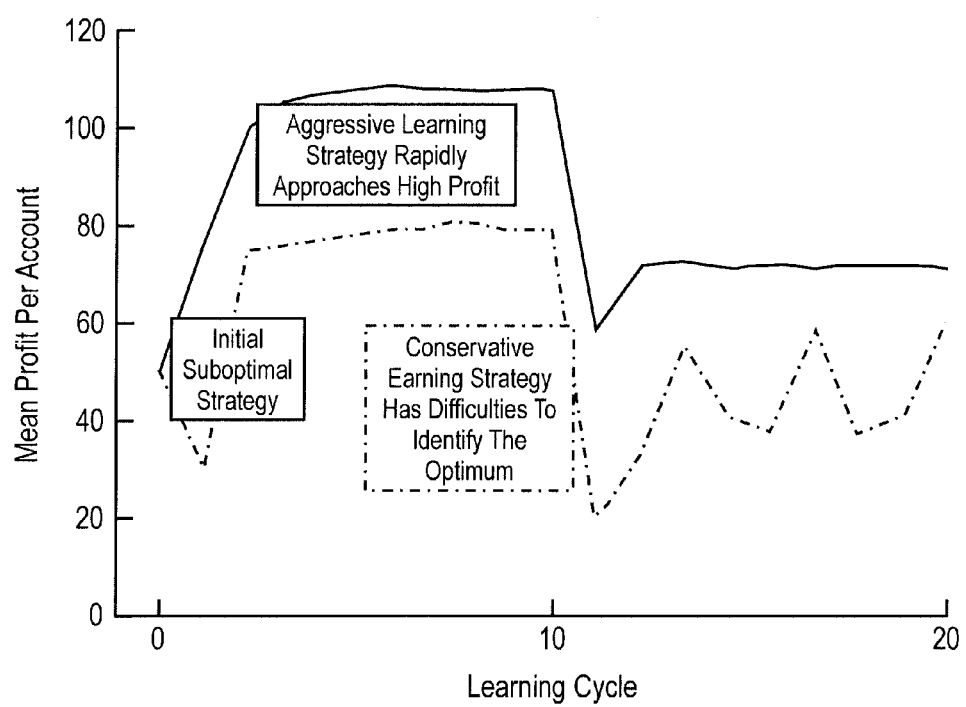
FIG. 15 provides a diagram comparing profit from over time from following two learning strategies, respectively.

The changes concern parameters that describe the reaction of consumers to line increases: we reduced the effect of line increases on future account balance for certain portfolio segments. Such a change could be triggered by a competitor who targets these segments with higher line offers, or by an economic shock. The graph of FIG. 15, illustrating profit over time from two learning strategies shows the time evolution of profit. The aggressive learning strategy outperforms the conservative learning strategy after completing the first learning cycle.

While the aggressive learning strategy rapidly delivers high profit, the conservative learning strategy has difficulties in identifying optimal operating conditions and profit remains sub-optimal. After the learning cycle, the aggressive learning strategy recovers quickly to achieve a somewhat smaller profit, while the conservative learning strategy falls into a substantially oscillatory behavior, again failing to identify better operating conditions and loosing out against the aggressive learning strategy. In addition to these two strategies, we also designed an ultra-aggressive learning strategy (not shown). Its profit was lower than that of the aggressive learning strategy.

The simulation not only demonstrates the benefit of learning strategies, but aids in their design. If testing is too limited, the estimated profit model remains inaccurate and the estimated optimal strategy can be mislead, thus reducing profit. Adequate testing will generate information-rich data, leading to more accurate estimates of the profit model. This, in turn, leads to good estimated optimal strategies that achieve high profit. On the other hand, if testing is too aggressive, the immediate opportunity cost of testing (instead of taking the recommended actions) out-weighs the future benefit of learning.

As indicated above, there exist alternate methods for estimating the benefit of testing by simulating outcomes. For example, an alternate method for estimating the benefit of testing by simulating outcomes from an experimental design is described infra.

I. Methodology to Estimate Benefit of Updates to Component Models (Assumes the Presence of an Estimate of Updated Model as Described in Stage II Below).

Figure 14A:
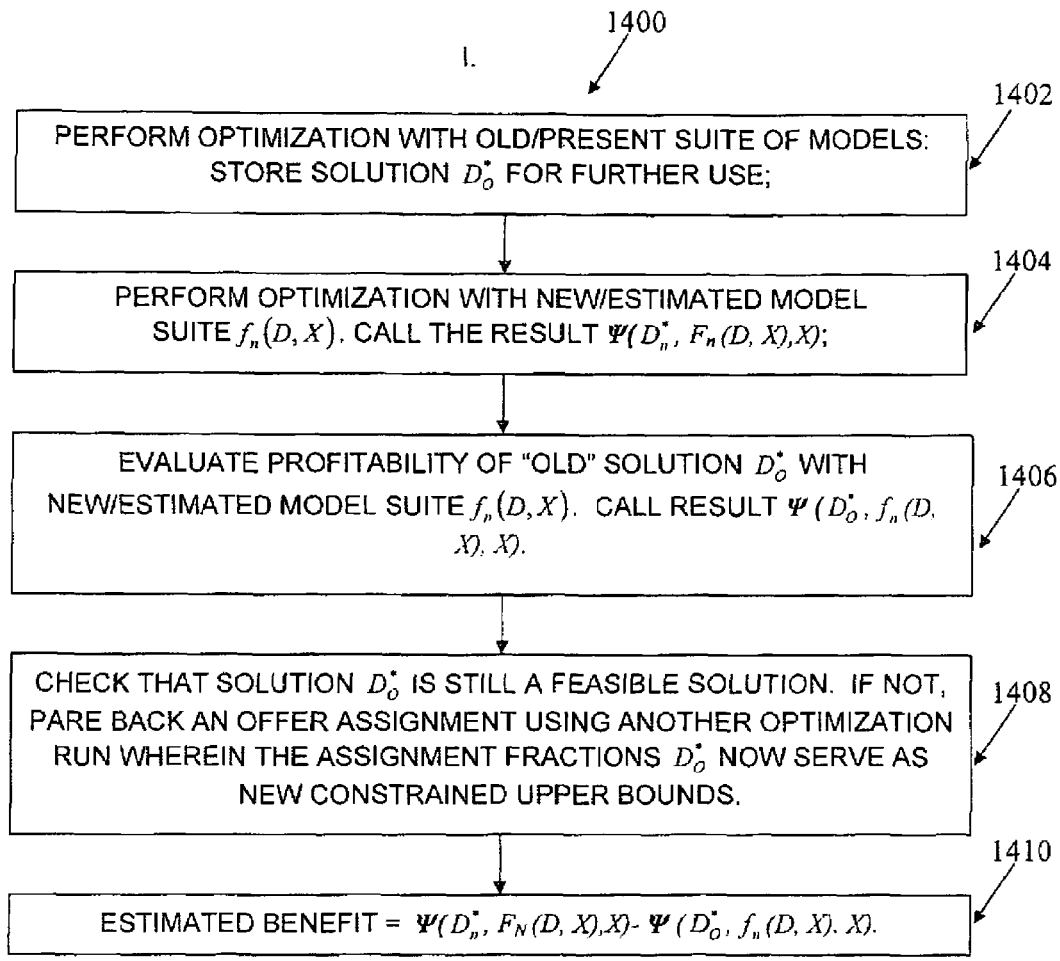
FIGS. 14A and B provide block diagrams of stages I and II, respectively, of a method for estimating the benefit of an improvement to a component model.
Figure 14B:
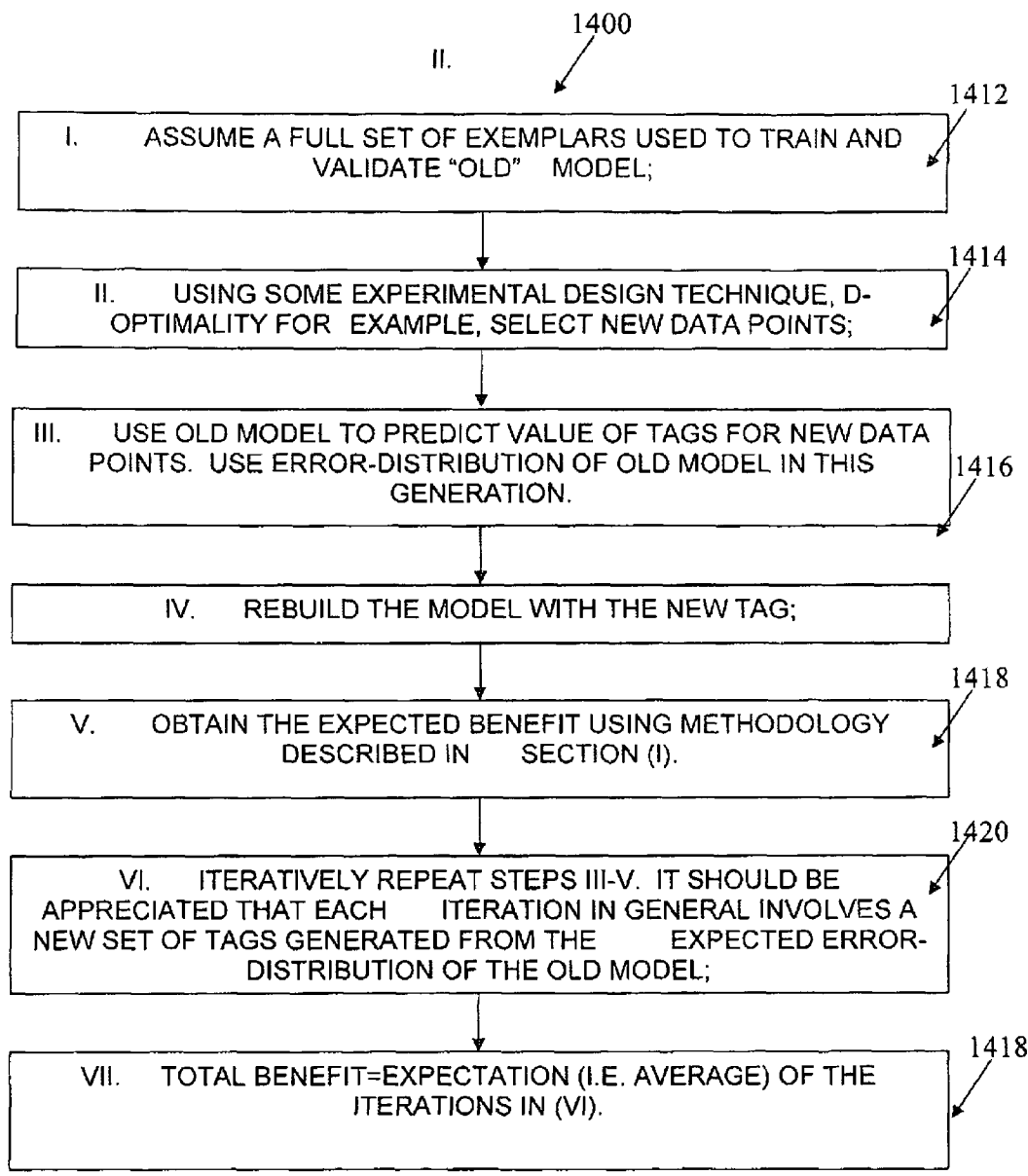

Let us use the notation $\Psi(D_O^*, f_o(D, X) X)$ to mean the value of the objective function on the data set X at the optimal configuration $D_O^*$ of decisions/actions made. The superscripts indicate that we have an optimal, while the subscript indicates that it is the optimal obtained for a particular version of the component models, $f_o(D,X)$. The goal of the present methodology is the improvement of these component models. We want to estimate the beneficial effect of any such update on $\Psi$. As shown in FIG. 14A, in overview, the present methodology 1400 includes at least the following steps:

Perform optimization with old/present suite of models: store $D_O^*$ for further use 1402;

Perform optimization with new/estimated model suite $f_n(D,X)$. Call the result $\Psi(D_n^*, f_n(D,X), X)$ 1404;

Evaluate profitability of old solution $D_O^*$ with new/estimated model suite $f_n(D,X)$. Call result $\Psi(D_O^*, f_n(D,X), X)$ 1406;

It is preferable to check that solution $D_O^*$ is still a feasible solution. If not, it is preferable to pare back an offer assignment using another optimization run wherein the assignment fractions $D_O^*$ now serve as new constrained upper bounds 1408; and Estimated benefit=$\Psi(D_n^*,f_n(D,X),X)-\Psi(D_O^*,f_n(D,X),X)$ 1410.

The sensitivity of the objective function to component models could be estimated by rerunning the optimization in "I" with the output of the component model as a global constraint, so that there is no change in the solution generated. However, a dual solution also produces the desired sensitivity analysis.

II. Model Estimation and Benefit Simulation Methodology 1400:

i. assume a full set of exemplars used to train and validate "old" model;

ii. Using some experimental design technique, D-optimality for example, select new data points 1414;

iii. Use old model to predict value of decision targets for the new data points. In one embodiment of the invention, the decision targets are customer value tags, which quantify the value of a customer to a business entity 1416.

Typically, the value of the customer to the business entity is an estimate of the potential profit to be made from the customer. The business entity bases decisions relating to the customer, such as whether or not to increase the customer's credit line, at least in part, on the value tags. Thus, the value tags, serve as a tool for balancing risk and potential profit of a particular business decision relating to a customer.

The error-distribution of the old model must be used in this generation. Ideally the error distribution will be Gaussian, with the center equal to output of old model, and width equal to the error of the old model on the historical validation set. However, this is likely to be heteroskadastic and, thus, the center may require an offset in certain regions of phase space;

iv. Rebuild the model with the new target 1418;

v. Obtain the expected benefit using Methodology described in section (I) 1420, vi. Iteratively repeat steps iii-v. It should be appreciated that each iteration in general involves a new set of targets generated from the expected error-distribution of the old model 1422;

vii. Total benefit=expectation (i.e. average) of the iterations in (vi) 1424.

The generation of tags is clear when testing only a single customer segment. Tests across multiple customer population segments may need to include correlations. The naïve alternative is to simply generate tags for various customer population segments as though they are independent. An example of when to include correlations would be, for example, if the ratio of the old model outputs for two segments is more accurate than the value of the model for either segment.

While we articulated the opportunity of closing the feedback loop with learning strategies for a greatly simplified credit line management scenario, the range of business problems that could benefit from learning strategies is much larger, for example offer testing for credit card marketing.

Analytic Value Chain Simulation (AVACS) can pinpoint the commercial potential of analytic innovations and lead to a better understanding of the operating conditions under which they add value. This provides an important input for business investment decisions into new analytics, e.g. whether to invest in transaction scoring. We presented the theory of AVACS and applied it to estimate the value of transaction scoring for managing credit lines, to understand the value of a novel reject inference technique, and to articulate the value of learning strategies, where AVACS also can aid the design of experiments.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A computer-implemented method for estimating a value of a transaction-based variable for credit line management, the method being implemented by one or more data processors and comprising:

providing, by at least one data processor, a first model for expected future profit that includes a transaction risk score that is controlled by a line increase decision strategy, the transaction risk score modeling features indicative of risk including default probability as a function of transaction time series features;

analyzing, by at least one data processor, pooled historical data from a plurality of lenders and relating to a plurality of loan recipients that capture a variety of line increases and identify account behavior before and after a line increase, the analyzing informing the first model;

estimating, by at least one data processor, future profit using second models that include and exclude transaction risk score as a data source respectively; and computing, by at least one data processor, the profit difference, the profit difference comprising an estimate of the value created by inclusion of the transaction risk score as a transaction-based variable;

wherein the first model is of the form:

$$E\text{profit}=f^+(X,CLI;\beta^+),$$

wherein X=data concerning the customer and wherein X includes the transaction risk score, the transaction risk score being the only transaction-based variable in the model, CLI represents potential credit line increase amounts, and $\beta^+$=model parameters that use the transaction risk score to contribute to the profit estimate;

wherein at least one of the second models is of the form:

$$E\text{profit}=f^-(X,CLI;\beta^-),$$

wherein $\beta^-$=model parameters that are constrained such that the transaction risk score does not contribute to the profit estimate.

2. A method as in claim 1, wherein the first model is for a predetermined time period.

3. A method as in claim 1, wherein the transaction risk score is the only transaction-based variable in the first model.

4. A method as in claim 1, further comprising: selecting a strategy based on the computed profit difference.

5. A computer-implemented method for implementation by one or more data processors comprising:

analyzing, by at least one data processor, pooled data from a plurality of lenders that capture a variety of line increases and identify account behavior before and after a line increase using a model for expected future profit, the model being controlled by a line increase decision strategy;

estimating, by at least one data processor, future profit for a customer separately using a first model that includes a transaction risk score as a data source and a second model that excludes the transaction risk score as a data source; and computing, by at least one data processor, the profit difference to enable a selection of an optimum line increase for the customer;

wherein the first model is of the form:

$$Eprofit = f^+(X, CLI; \beta^+),$$

wherein X=data concerning the customer and wherein X includes the transaction risk score, the transaction risk score being the only transaction-based variable in the model, CLI represents potential credit line increase amounts, and $\beta^+$=model parameters that use the transaction risk score to contribute to the profit estimate;

wherein the second model is of the form:

$$Eprofit = f(X, CLI; \beta^-),$$

wherein $\beta^-$=model parameters that are constrained such that the transaction risk score does not contribute to the profit estimate.

6. A method as in claim 5, wherein the first model is for a predetermined time period.

7. A method as in claim 5, wherein the transaction risk score is the only transaction-based variable in the first model.

8. A method as in claim 5, further comprising: selecting, by at least one data processor, a strategy based on the computed profit difference.

9. An article for estimating a value of a transaction-based variable for credit line management, the article comprising a tangible machine-readable storage medium embodying instructions that when performed by one or more machines result in operations comprising:

providing a model for expected future profit that includes a transaction risk score that is controlled by a line increase decision strategy;

analyzing pooled data that capture a variety of line increases and identify account behavior before and after a line increase;

estimating future profit using models that include and exclude transaction risk score as a data source respectively; and computing the profit difference, the profit difference comprising an estimate of the value created by inclusion of the transaction-based variable;

wherein the model for expected future profit is of the form:

$$Eprofit = f(X, CLI; \beta),$$

wherein X=data concerning a customer and wherein X includes the transaction risk score, the transaction risk score being the only transaction-based variable in the model, CLI represents potential credit line increase amounts, and $\beta$=model parameters.

10. An article as in claim 9, wherein the model is for a predetermined time period.

11. An article as in claim 9, wherein the transaction risk score is the only transaction-based variable in the model.

12. An article as in claim 9, wherein the article further embodies instructions that when performed by one or more machines result in operations comprising:

selecting a strategy based on the computed profit difference.

13. An article comprising a tangible machine-readable storage medium embodying instructions that when performed by one or more machines result in operations comprising:

analyzing pooled data from a plurality of lenders that capture a variety of line increases and identify account behavior before and after a line increase using a model for expected future profit, the pooled data being generated from a plurality of loan recipients, the model being controlled by a line increase decision strategy;

estimating future profit for a customer using models that include and exclude a transaction risk score as a data source respectively; and computing the profit difference to enable a selection of an optimum line increase for the customer;

the model including the transaction risk source as a data source having the form:

$$Eprofit = f^+(X, CLI; \beta^+),$$

wherein X=data concerning the customer and wherein X includes the transaction risk score, the transaction risk score being the only transaction-based variable in the model, CLI represents potential credit line increase amounts, and $\beta^+$=model parameters that use the transaction risk score to contribute to the profit estimate;

the model excluding the transaction risk source as a data source having the form:

$$Eprofit = f^-(X, CLI; \beta^-),$$

wherein $\beta^-$=model parameters that are constrained such that the transaction risk score does not contribute to the profit estimate.

14. An article as in claim 13, wherein the model is for a predetermined time period.

15. An article as in claim 13, wherein the transaction risk score is the only transaction-based variable in the model.

16. An article as in claim 13, wherein the article further embodies instructions that when performed by one or more machines result in operations comprising:

selecting a strategy based on the computed profit difference.

17. An article as in claim 9, wherein the model is generated by:

providing, by at least one of the data processors, an initial model for a time-dependent relationship for expected profit from a credit card operation that is controlled by a line increase decision strategy;

iteratively simulating the future outcomes wherein the simulating is jump-started with an empirical sample and wherein associated actions are then simulated according to a first posited learning strategy;

calculating, by at least one of the data processors, mean profit per account from the first posited learning strategy using the initial model;

simulating, by at least one of the data processors, future outcomes based on the parameters of the initial profit model wherein an initial strategy development set is generated;

varying, by at least one of the data processors, the profit model over time, as indicated by a time variant parameter vector;

over learning cycles t=1, ..., T: estimating, by at least one of the data processors, a profit model based on a previous strategy development set;

estimating, by at least one of the data processors, an optimal strategy resulting in recommended line increases for the learning strategy;

stochastically assigning, by at least one of the data processors, test actions according to a test design;

calculating, by at least one of the data processors, mean profit per account for the learning strategy from a posited model; and updating, by at least one of the data processors, the development data set by simulating future account behavior from a parameter vector from the posited model, where $t \leq t+1$.

* * * * *